(12) United States Patent
Lewis et al.

(10) Patent No.: US 8,343,002 B1
(45) Date of Patent: Jan. 1, 2013

(54) ROTATING PLANETARY GEAR CARRIER LUBRICATION DEVICE

(75) Inventors: Charles Wayne Lewis, Brighton, MI (US); Boris Burgman, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 29 days.

(21) Appl. No.: 13/164,390

(22) Filed: Jun. 20, 2011

(51) Int. Cl.
*F16H 57/04* (2010.01)
(52) U.S. Cl. .......................................... 475/159
(58) Field of Classification Search ................... 475/159
See application file for complete search history.

(56) References Cited

U.S. PATENT DOCUMENTS

| | | | |
|---|---|---|---|
| 2005/0209039 A1* | 9/2005 | Kempf | 475/159 |
| 2006/0223665 A1* | 10/2006 | Matsushita et al. | 475/159 |
| 2009/0247348 A1* | 10/2009 | Haupt et al. | 475/159 |
| 2009/0253545 A1* | 10/2009 | Diosi et al. | 475/159 |
| 2010/0179011 A1* | 7/2010 | Demtroder et al. | 475/159 |

* cited by examiner

*Primary Examiner* — Edwin A Young

(57) ABSTRACT

A planetary gear assembly having improved planet gear lubrication includes a thrust bearing assembly mounted to the planet gear carrier which provides a friction reducing interface between the carrier and a hub or stationary transmission member. A lubrication dam located radially outwardly of the thrust bearing assembly collects transmission fluid (oil) that has been supplied through a centrally disposed shaft and driven to and past the thrust bearing and into the dam by centrifugal force. Transmission fluid collecting within the dam and between the thrust bearing assembly and the planet gear carrier generates a biasing force which drives the thrust bearing assembly away from the planet gear carrier, thereby ensuring that the bearing position is not indeterminate and positively locating the thrust bearing assembly and providing an annular flow path for the transmission fluid which is then directed into a plurality of axial passageways in stub shafts which support the planet gears. At least one radial passageway in each stub shaft provides lubricating transmission fluid to a bearing assembly disposed between the stub shaft and the planet gear.

20 Claims, 2 Drawing Sheets

ROTATING PLANETARY GEAR CARRIER LUBRICATION DEVICE

FIELD

The present disclosure relates to planetary gear assemblies typically utilized in automatic transmissions for motor vehicles and more particularly a device for improving lubrication of the planet gears of planetary gear assemblies typically utilized in automatic transmissions for motor vehicles.

BACKGROUND

The statements in this section merely provide background information related to the present disclosure and may or may not constitute prior art.

The majority of modern motor vehicle automatic transmissions include a plurality of planetary gear assemblies arranged in tandem in a housing. An input shaft drives a torque converter which, in turn, drives an element of the first of the plurality of planetary gear assemblies. Typically, an element of the last planetary gear assembly is connected to and drives an output shaft.

Within the automatic transmission, in addition to the planetary gear assemblies, are various fixed connections and bearings, and clutches and brakes which select, engage and provide the various forward gears and reverse. There are typically numerous ball, roller and needle bearing assemblies of both conventional and thrust types.

Because of the tandem arrangement of the transmission, several thrust bearings are typically utilized to separate closely adjacent components that rotate at different speeds. And because of this arrangement and the complexity of automatic transmissions, it is typically not possible to eliminate all axial space between the faces of a thrust bearing when it is installed between components in the transmission. The indeterminate axial position of a thrust bearing becomes a particular problem when the space adjacent one face of the thrust bearing is relied upon to provide a transmission fluid lubrication path to the associated components of, for example, a planetary gear assembly.

The present invention is directed to solving these problems.

SUMMARY

The present invention provides a planetary gear assembly adapted for incorporation into an automatic transmission having improved planet gear (pinion) lubrication. The planetary gear assembly includes a thrust bearing assembly mounted to the planet gear carrier which provides a friction reducing interface between the carrier and an adjacent hub or stationary transmission member. A lubrication dam disposed radially outwardly of the thrust bearing assembly collects transmission fluid (oil) that has been supplied through a centrally disposed shaft and driven past the thrust bearing and into the dam by centrifugal force. Transmission fluid collecting within the dam and between the thrust bearing assembly and the planet gear carrier provides a biasing force which drives the thrust bearing assembly away from the planet gear carrier, thereby positively locating the thrust bearing assembly and providing an annular flow path for the transmission fluid which is then directed into a plurality of axial passageways in stub shafts which support the planet gears. At least one radial passageway in each stub shaft provides lubricating transmission fluid to a bearing assembly disposed between the stub shaft and the planet gear.

Thus it is an aspect of the present invention to provide a planetary gear assembly having improved planet gear lubrication.

It is a further aspect of the present invention to provide an improved planetary gear assembly for use in an automatic transmission.

It is a still further aspect of the present invention to provide a planetary gear assembly having a lubrication dam disposed on a planet gear carrier.

It is a still further aspect of the present invention to provide a planetary gear assembly having a thrust bearing assembly and a lubrication dam disposed adjacent thereto.

It is a still further aspect of the present invention to provide a planetary gear assembly having a lubrication dam which generates a biasing force against an associated thrust bearing assembly.

It is a still further aspect of the present invention to provide a planetary gear assembly having a lubrication dam which generates a biasing force against an associated thrust bearing assembly to ensure that the position of the thrust bearing assembly is not indeterminate.

It is a still further aspect of the present invention to provide a planetary gear assembly having a lubrication dam which directs transmission fluid into a circumferential channel in an end of a planet gear carrier.

It is a still further aspect of the present invention to provide an automatic transmission having at least one planetary gear assembly having a lubrication dam according to the present invention.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
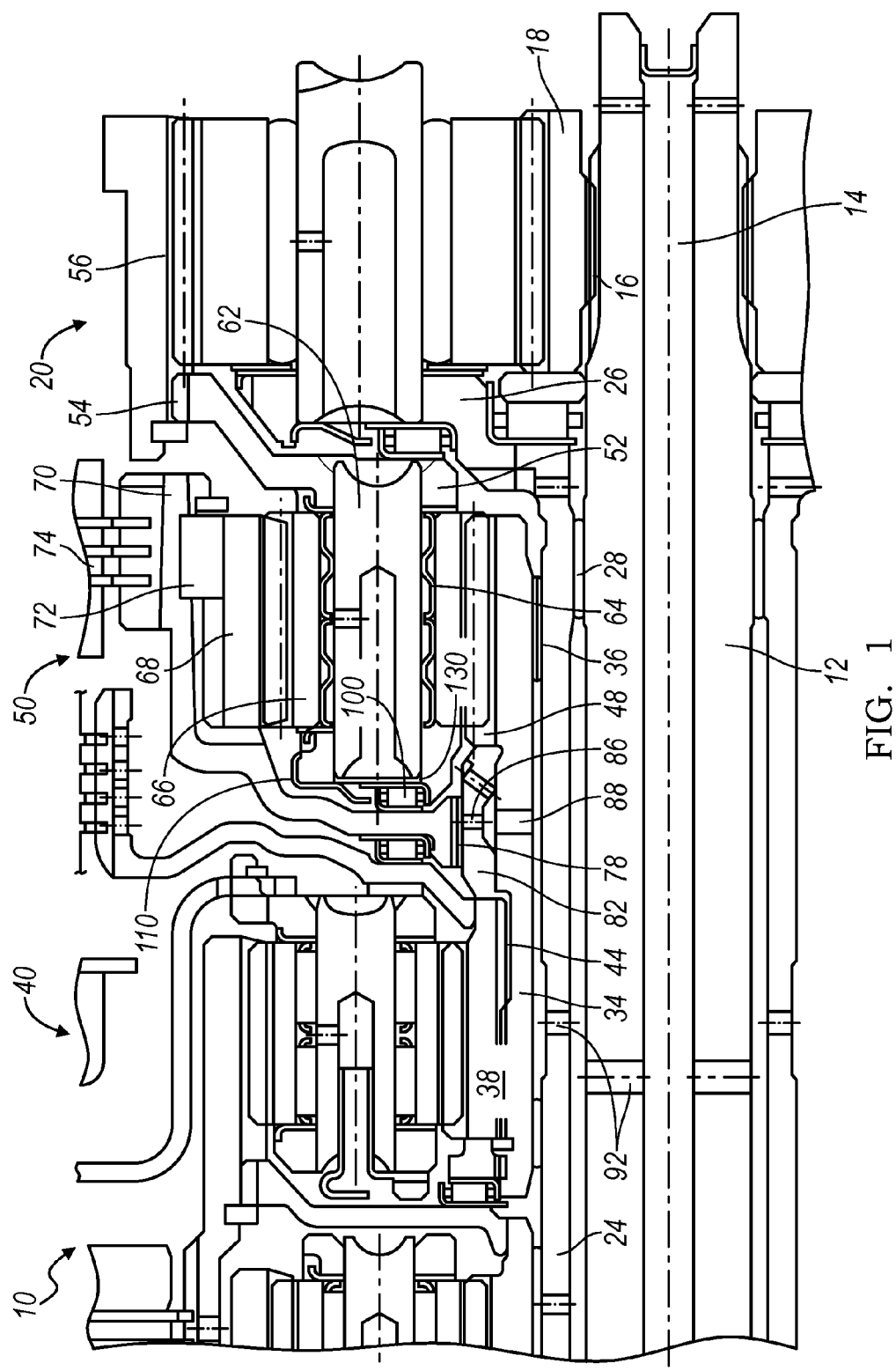
FIG. 1 is a full, sectional view of a portion of an automatic transmission incorporating the present invention.

With reference to FIG. 1, a portion of an automatic transmission incorporating the present invention is illustrated and generally designated by the reference number 10. The automatic transmission 10 includes a centrally disposed drive shaft 12 which defines the center axis of the transmission 10 about which all major components rotate. The drive shaft 12 typically and preferably includes a coaxial lubrication passageway 14 that is provided with pressurized transmission fluid (oil) from a hydraulic pump (not illustrated) which, among other uses, is distributed to various components of the automatic transmission 10 to lubricate them. The drive shaft 12 may be connected by an interengaging spline set 16 to a first sun gear 18 of a first planetary gear assembly 20. Disposed concentrically about the drive shaft 12 is a first quill or tubular drive member 24 that carries drive torque between a component of the transmission 10 and a first planet gear carrier 26 of the first planetary gear assembly 20. The first quill or tubular drive member 24 may be supported on the drive shaft 12 by roller bearing assemblies 28, one of which is illustrated in FIG. 1.

A second quill or tubular drive member 34 is similarly supported on the first quill or tubular drive member 24 by roller bearing assemblies 36 and couples a second sun gear 38 of a second planetary gear assembly 40 through an interengaging spline set 44 with an integrally formed third sun gear 48 of a third planetary gear assembly 50. The third planetary gear assembly 50 also includes a planet gear carrier 52 which is coupled through an interengaging spline set 54 to a first ring gear 56 of the first planetary gear assembly 20. The planet gear carrier 52 locates and supports a plurality of stub shafts 62 which receive a like plurality of roller bearing assemblies 64 and a like plurality of planet gears or pinions 66. The planet gears or pinions 66 are in constant mesh with the third sun gear 48 and a third ring gear 68. The third ring gear 68 is coupled to a collar or hub 70 by an interengaging spline set 72 and the collar or hub 70 is selectively grounded to a housing (not illustrated) through a friction brake 74 or similar device.

The collar or hub 70 is piloted on a roller bearing assembly 78 which is, in turn, supported on an fluid directing annulus 82 received on the second quill or tubular drive member 34. The third sun gear 48 on the second quill or tubular drive member 34 locates the right edge of the annulus 82 and limits its translation to the right as illustrated in FIG. 1. The annulus 82 includes a plurality of radial and oblique lubrication ports or passageways 86 which generally align with a plurality of lubrication passageways 88 in the second quill or tubular drive member 34. Additional lubrication passageways 92 in the first quill or tubular drive member 24 and the drive shaft 12 complete a flow path from the coaxial lubrication passageway 14 to the oblique lubrication ports or passageways 86.

Figure 2:
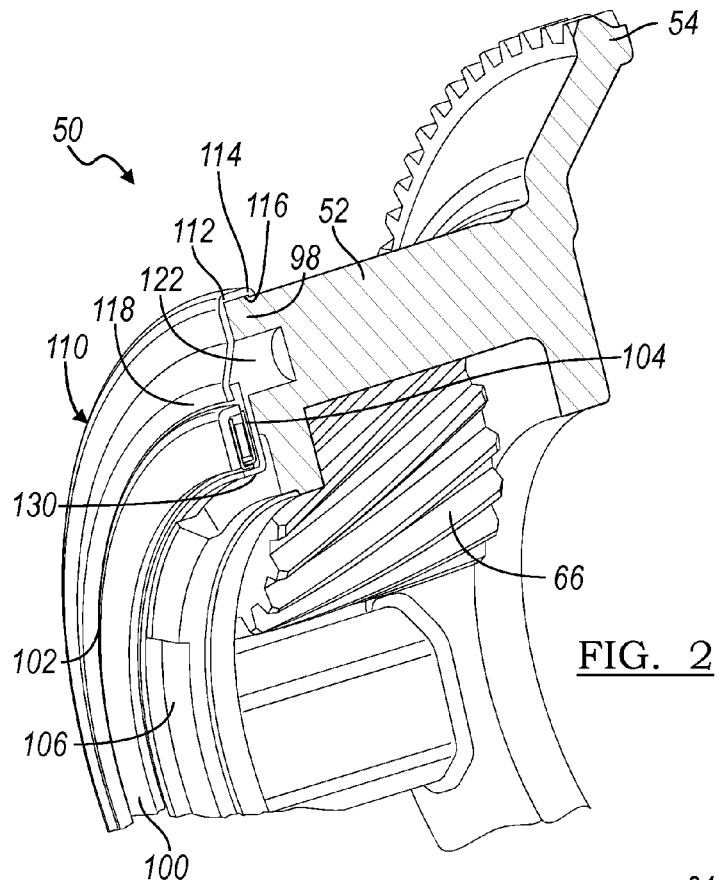
FIG. 2 is an enlarged, perspective view of a planetary gear carrier in partial section incorporating the present invention.
Figure 3:
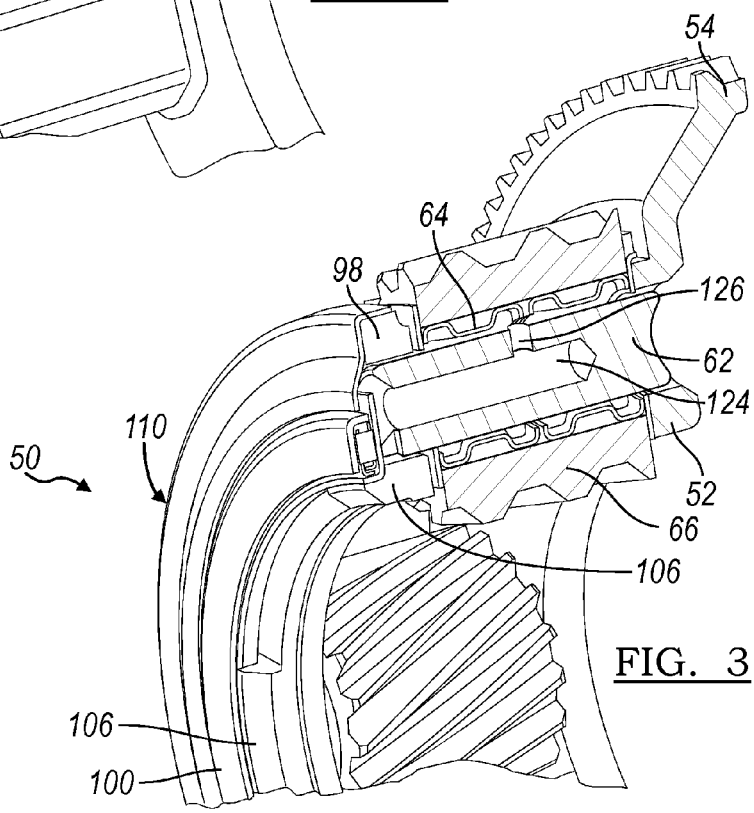
FIG. 3 is an enlarged, perspective view of a planetary gear carrier in partial section taken through a planet gear and shaft incorporating the present invention.

Referring now to FIGS. 1, 2 and 3, disposed between the hub or collar 70 and an end 98 of the planet gear carrier 52 is a thrust bearing assembly 100. The thrust bearing assembly 100 is conventional and includes a first or left bearing plate or housing 102 and a second or right bearing plate or housing 104. The thrust bearing assembly 100 is piloted on a plurality of spaced apart lugs or ears 106 extending from the end 98 of the planet gear carrier 52 which generally engage the right bearing plate or housing 104. Disposed radially outwardly from the thrust bearing assembly 100 and generally aligned radially with it is an annular lubrication dam 110. The lubrication dam 110 includes an axially extending first portion 112 preferably having an inwardly turned lip 114 that is received, seated and retained within a circumferential groove 116 adjacent the end 98 of the planet gear carrier 52. The lubrication dam 110 also includes a radially and obliquely inwardly extending second portion 118 that terminates near, but does not contact, the thrust bearing assembly 110. Thus, the inner end of the second portion 118 is axially spaced out or away from the end 98 of the planet gear carrier 52.

The end 98 of the planet gear carrier 52 also includes an annular groove or channel 122. Intersecting the annular groove or channel 122 at a plurality of locations around the end 98 of the planet gear carrier 52 are the plurality of stub shafts 62 that define or include blind axial passageways 124. Thus, the annular groove or channel 122 is in fluid communication with the plurality of blind axial passageways 124. Each of the plurality of stub shafts 62 also includes at least one radial passageway or port 126 in fluid communication with the blind axial passageway 124.

In operation, it will be appreciated that the pressurized flow of transmission fluid (hydraulic oil) through the coaxial lubrication passageway 14, the lubrication passageways 92 and 88, the oblique ports or passageways 86 and the rotation of such components provides a radially outward, energetic flow of transmission fluid generally toward the right bearing plate or housing 104 of the thrust bearing assembly 100. The lubrication dam 110 confines such fluid flow and, first of all, generates a force that biases the thrust bearing assembly 100 to the left in FIG. 1 to ensure that the position of the thrust bearing assembly 100 is not indeterminate, and thereby maintains an annular fluid passageway 130 between the right side bearing plate or housing 104 of the thrust bearing assembly 100 and the end 98 of the planet gear carrier 52 and, second of all, directs such fluid flow into the annular channel or groove 122 through which it flows into the blind axial passageways 124 and the radial ports or passageways 126 of the stub shafts 62 to lubricate the roller bearing assemblies 64.

It should be appreciated that although the invention has been described in conjunction with a simple planetary gear assembly 50, that is, a planetary gear assembly in which the planet gears 66 mesh directly with both the associated sun gear 48 and the ring gear 56, it is equally suitable and appropriate for use with a compound planetary gear assembly having a sun gear, a plurality of intermediate gear trains comprising two planet gears (pinions) and thus multiple stub shafts disposed at two distinct radii from the center of the planetary gear assembly and a ring gear.

Additionally, it should be understood that while the lubrication dam 110 is illustrated and described in the foregoing text only in connection with one (the third) planetary gear assembly 50, it may readily be utilized on the other planetary gear assemblies 20 and 40 and in similar applications in automatic transmissions as well as in other devices employing planetary gear assemblies.

The description of the invention is merely exemplary in nature and variations that do not depart from the gist of the invention are intended to be within the scope of the invention. Such variations are not to be regarded as a departure from the spirit and scope of the invention.

What is claimed is:

1. A planetary gear assembly having improved lubrication comprising, in combination, a sun gear, a planet gear carrier having a plurality of stub shafts each defining a lubrication passageway, a plurality of planet gears freely rotatably disposed on said plurality of stub shafts and a ring gear, said plurality of planet gears in constant mesh with said sun gear and said ring gear, said planet gear carrier having an end defining an annular channel in fluid communication with said plurality of lubrication passageways in said stub shafts, a thrust bearing assembly disposed at said end of said planet gear carrier, and a lubrication dam secured to said end of said planet gear carrier and having a end portion terminating proximate said thrust bearing, whereby radially translating fluid engaging said lubrication dam is directed toward said annular channel and said lubrication passageways.

2. The planetary gear assembly of claim 1 wherein said sun gear is coupled to a drive tube and said ring gear is coupled to a brake.

3. The planetary gear assembly of claim 1 wherein said lubrication passageways in said stub shafts include an axial passageway intersecting at least one radial passageway.

4. The planetary gear assembly of claim 1 wherein said plurality of planet gears are supported on roller bearing assemblies disposed on said stub shafts.

5. The planetary gear assembly of claim 1 whereby said radially translating fluid collects in said lubrication dam and provides a biasing force to translate said thrust bearing assembly away from said end of said planetary gear assembly.

6. The planetary gear assembly of claim 1 wherein said end of said planet gear carrier includes a plurality of spaced apart lugs for engaging said thrust bearing assembly.

7. The planetary gear assembly of claim 1 wherein said lubrication dam includes a first axially extending portion and a second radially inwardly extending portion.

8. A planetary gear assembly having a lubrication directing feature comprising, in combination,
- a sun gear, a planet gear carrier having a plurality of stub shafts each defining a lubrication opening, a planet gear disposed on each of said plurality of stub shafts and a ring gear, said plurality of planet gears in constant mesh with said sun gear and said ring gear, said planet gear carrier having an end defining an annular channel in fluid communication with said plurality of stub shafts,
- a thrust bearing assembly disposed adjacent said end of said planet gear carrier, and
- a lubrication dam secured to said end of said planet gear carrier and having a end portion terminating proximate said thrust bearing and away from said planet gear carrier.

9. The planetary gear assembly of claim 8 whereby radially translating fluid engaging said lubrication dam is directed toward said annular channel and said lubrication openings and collects in said lubrication dam and provides a biasing force to translate said thrust bearing assembly away from said end of said planetary gear assembly.

10. The planetary gear assembly of claim 8 wherein said lubrication dam includes a first axially extending portion and a second radially inwardly extending portion.

11. The planetary gear assembly of claim 8 wherein said end of said planet gear carrier includes a plurality of spaced apart lugs for supporting and locating said thrust bearing assembly.

12. The planetary gear assembly of claim 8 wherein said plurality of planet gears are supported on roller bearing assemblies disposed on said stub shafts.

13. The planetary gear assembly of claim 8 wherein said lubrication openings in said stub shafts include an axial passageway intersecting at least one radial passageway.

14. A planetary gear assembly having improved planet gear lubrication comprising, in combination,
- a sun gear, a planet gear carrier having a plurality of stub shafts each defining an axial lubrication passageway intersecting at least one lubrication port, a planet gear disposed on each of said plurality of stub shafts and a ring gear, said plurality of planet gears in constant mesh with said sun gear and said ring gear, said planet gear carrier having an end defining an annular channel in fluid communication with said axial lubrication passageways in said plurality of stub shafts,
- a thrust bearing assembly disposed adjacent said end of said planet gear carrier, and
- a lubrication dam mounted on said end of said planet gear carrier and including an end portion terminating proximate said thrust bearing.

15. The planetary gear assembly of claim 14 wherein said assembly is a simple planetary gear assembly.

16. The planetary gear assembly of claim 14 wherein said planet gears are supported on roller bearing assemblies on said plurality of stub shafts.

17. The planetary gear assembly of claim 14 wherein said end of said planet gear carrier includes a plurality of spaced apart lugs for supporting and locating said thrust bearing assembly.

18. The planetary gear assembly of claim 14 wherein said lubrication dam also includes an axially extending portion.

19. The planetary gear assembly of claim 14 whereby radially translating fluid engaging said lubrication dam is directed toward said annular channel and said axial lubrication passageways in each of said stub shafts and collects in said lubrication dam and provides a biasing force to translate said thrust bearing assembly away from said end of said planetary gear assembly.

20. The planetary gear assembly of claim 14 further including a hub disposed on a opposite side of said thrust bearing from said planetary gear assembly, said hub coupled to said ring gear of said planetary gear assembly by an interengaging spline set.

* * * * *